March 31, 1953  E. ALLAN  2,633,073
MACHINE FOR COOKING FOODSTUFFS
Filed April 25, 1950  2 SHEETS—SHEET 1
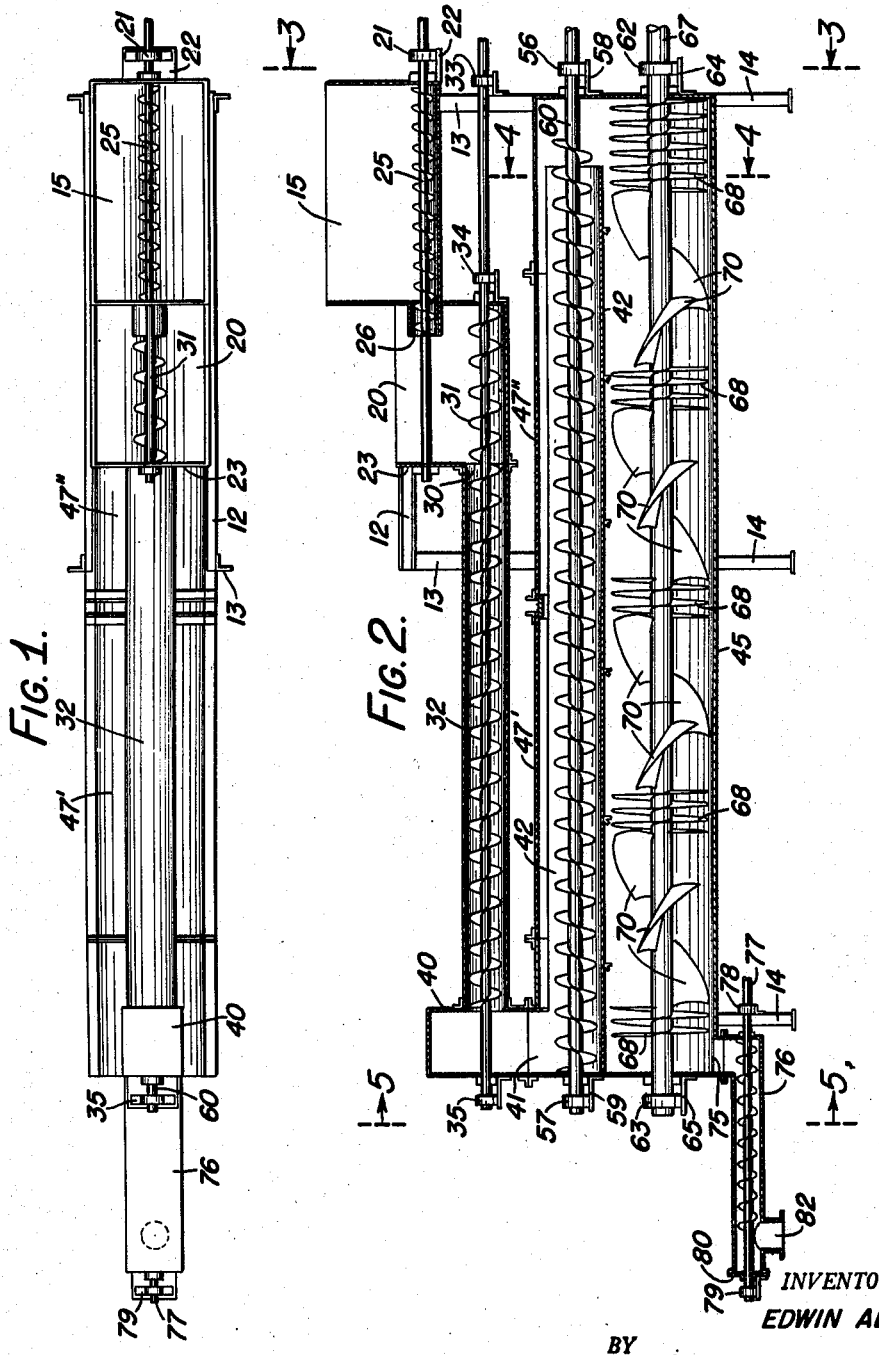
INVENTOR.
EDWIN ALLAN
BY
ATTORNEY March 31, 1953  E. ALLAN  2,633,073
MACHINE FOR COOKING FOODSTUFFS
Filed April 25, 1950  2 SHEETS—SHEET 2

INVENTOR.
EDWIN ALLAN
BY
*BFshlringer*
ATTORNEY

Patented Mar. 31, 1953

2,633,073

UNITED STATES PATENT OFFICE 2,633,073

MACHINE FOR COOKING FOODSTUFFS

Edwin Allan, Spencerport, N. Y., assignor to Allan Iron & Welding Works, Inc., Rochester, N. Y., a corporation of New York Application April 25, 1950, Serial No. 157,870

3 Claims. (Cl. 99—239)

The present invention relates to machines for cooking foods and more specifically to machines for cooking applesauce.

Some apples are softer than others, and, therefore, cook up more readily. One difficulty in preparing applesauce in conventional cooking machines has been to avoid having partially-cooked lumps of apples in the finished product. This has been especially difficult where several different kinds of apples are mixed together to form the sauce. It is difficult to cook the harder apples to the desired consistency without making a watery mush of the softer apples. For many years, therefore, it has been a custom in the food industry after pre-cooking the apples to pass them through a retort, with the object of obtaining more uniform consistency in the final product.

A primary object of the present invention is to provide a cooker for applesauce and similar food products which will eliminate any necessity for passing the apples after pre-cooking into a retort before the final cooking step.

A further object of the invention is to provide an applesauce cooker in which harder chunks of apples can be exposed to the cooking steam during the cooking operation in such manner as to cook them down to the desired consistency without overcooking softer apples.

Another object of the invention is to provide an applesauce cooker in which pre-cooking and final cooking can be effected in the same machine.

Another object of the invention is to provide an applesauce cooker in which part of a batch of apples may be precooked while another part is being subjected to final cooking.

A further object of the invention is to provide an applesauce cooker in which pre-cooking is effected both with direct steam and with the heat of convection generated from the steam used in the final cooking operation.

A still further object of the invention is to provide an applesauce cooker which will lend itself to continuous operation.

Still further objects of the invention are to provide an applesauce cooker which is more efficient in operation and in which the desired rate of cooking can be precisely controlled and maintained.

Other objects of the invention will be apparent hereinafter from the specification.

In the drawings:

Fig. 1 is a plan view of a machine built according to one embodiment of this invention;

Fig. 2 is a vertical sectional view through this machine;

Figure 3:
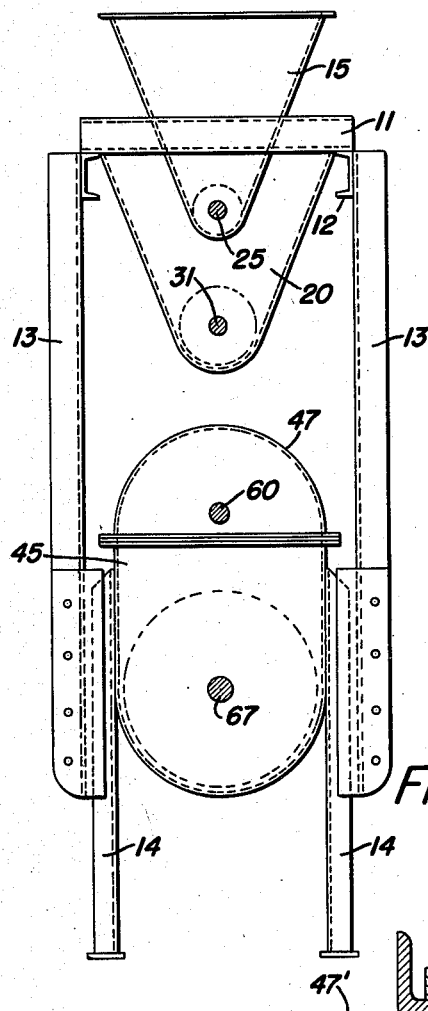
Fig. 3 is an end view of the machine looking from the right hand side of Fig. 2, as indicated by the line 3—3 in that figure, and on an enlarged scale.

Referring now to the drawings by numerals of reference, the framework of the machine comprises parallel cross-rails 11, parallel side rails 12, spaced pairs of parallel uprights 13, and spaced pairs of parallel supporting legs or feet 14.

Mounted at the top of the framework and supported thereby is a hopper 15 for one of the ingredients of the cook, for instance, the sugar required in the production of the applesauce. Mounted on the framework of the machine at the left hand end of the hopper 15 and at a somewhat lower level is the second hopper 20 which is adapted to receive, for instance, the chopped apples.

Journaled at one end in a block 21, that is carried by a bracket 22 which is supported from the frame of the machine, and at its opposite end in the left hand end wall 23 of the hopper 20, is a screw feed shaft 25. This shaft lies in the bottom of hopper 15 and projects through an open port 26 in the lower left hand wall of the hopper 15 so as to feed sugar out of the hopper 15 into the hopper 20, thereby to mix sugar with the apples.

The mixture of apples and sugar is fed out of the hopper 20 through a port opening 30 in the lower left hand wall thereof by a screw feed shaft 31. This shaft is mounted within a tube 32 that is secured at one end to the left hand end wall 23 of hopper 20, and at its opposite end to the right hand wall of a vertical duct 40. The shaft 31 is journaled in blocks 33, 34 and 35 that are supported by brackets from the frame of the machine.

The vertical duct 40 is open at its lower end and forms a cover for the inlet port 41 of a U-shaped channel member 42 (Fig. 4) which is supported within the upper portion of the cooking tank 45 by spaced pairs of uprights 46. These uprights are riveted or welded to cross-bars 47A that are fastened to the inside walls of the tank.

Figure 6:
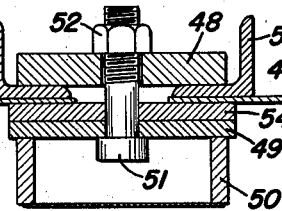
Fig. 6 is a fragmentary sectional view on a greatly enlarged scale showing the clamp for locking the sections of the cover of the cooking tank together.

The tank has a cover 47 which is made in two sections denoted at 47' and 47", respectively, in Figs. 2 and 6. The two sections of the cover are removably clamped together by the disc 48, disc 49, bar 50, bolt 51, and nut 52. The bar 50 is welded or otherwise secured to the disc 49. The disc 48 engages one flange of each of two arcuate reinforcing bars 53 that are welded or riveted to the cover sections 47' and 47". Interposed between the disc 49 and the cover sections is a rubber gasket 54.

The tank 45 is supported between the legs 14 of the frame being riveted, welded, or otherwise secured thereto. Journaled in blocks 56 and 57 that are supported by brackets 58 and 59 from the opposite end walls of the tank 45 is a feed screw shaft 60. This shaft rotates in the U-shaped channel 42 and is adapted to feed the mixture of sugar and chopped apples through the channel from left to right. The right hand end of the channel terminates short of the right hand end of the tank so that the mixture fed by the feed screw shaft 60 drops from the right hand end of the channel into the bottom of the tank 45 at the right hand end thereof.

Journaled in blocks 62 and 63, which are supported by brackets 64 and 65, respectively, from opposite end walls of the tank, is a shaft 67. This shaft is provided with a plurality of spaced feed screw sections 68 and with a plurality of vane or paddle sections. The feed screw sections 68 may have, as shown, different numbers of convolutions. There are three vanes or paddles 70 in each paddle section. The vanes or paddles in each paddle section are spaced 120° apart and are arranged helically along the shaft 67. Each vane or paddle is of concave-convex shape in cross-section.

Figure 4:
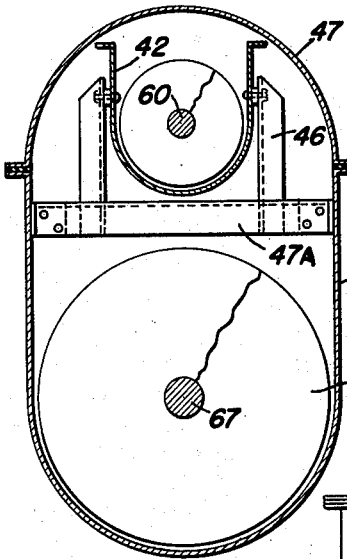
Fig. 4 is a section on the line 4—4 of Fig. 2 looking in the direction of the arrows.
Figure 5:
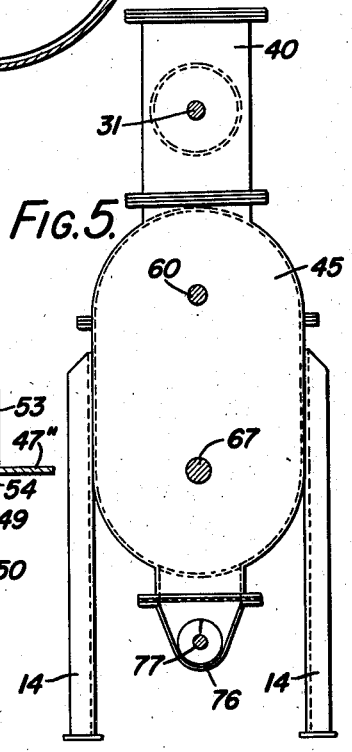
Fig. 5 is a section on the line 5—5 of Fig. 2 looking in the direction of the arrows.
Figure 7:
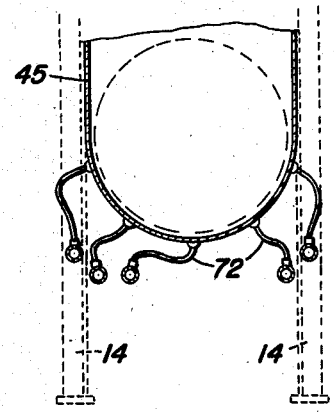
Fig. 7 is a fragmentary sectional view showing the lower end of the cooking tank and the steam ducts leading thereto.

The screw sections 68 and the paddle sections of the shaft 67 are of such hand, and the shaft itself is rotated in such direction as to feed the mixture through the tank from right to left. Live steam is injected into the bottom of the tank 45 through tubes 72 (Fig. 7). This live steam serves to cook the mixture of apples and sugar as the mixture is conveyed from right to left in the tank by the feed shaft 67. The U-shaped channel member 42 is supported by the brackets 46 so that there is some space, as shown in Fig. 4, between the cover 47 and the top flanges of the channel member. The steam injected into the tank 45 rising in the tank can therefore penetrate into the U-shaped channel member to help pre-cook the mixture as it is fed from left to right through this channel member by the feed screw shaft 60. Pre-cooking is also achieved in channel member 42 because the steam in the tank 45 heats the bottom of this channel member, and causes the channel member to pre-cook by convection the mixture travelling therethrough. The apples travelling through the channel member 42 are therefore pre-cooked by the heat rising from the steam in the tank 45 and by the steam passing directly into the channel member in the spaces between the cover 47 and the channel member.

The pitch of the feed screw 60 is much greater than the pitch of the feed screw sections 68 of feed shaft 67 so that the apples are moved at a much faster rate through the pre-heating trough 42 than through the tank proper. The vanes or paddles 70 are so shaped that they scoop up the mixture of apples and sugar as feed shaft 67 revolves, thereby intermittently lifting some of the cooking mixture up out of the slurry of the sauce as it is being fed along the bottom of the tank. The paddles pick up the applesauce in thin sheets allowing the steam to completely permeate the cook. Thus, the lumps of apples, which have not been cooked down, may be exposed directly to the live steam in the tank, thereby being cooked more intensively than they would be if they remained in the slurry of sauce in the bottom of the tank. The hard portions of the apples are scooped up out of the soggy sauce being formed in the bottom of the tank and the uncooked portions of the apples are exposed directly to the steam. Thus the lumps are reduced to the desired consistency of the sauce without making the sauce itself too mushy. This is an important feature of the machine.

The cooked sauce is delivered from the left hand end of the tank through a discharge port 75 into a tube 76. A feed screw shaft 77 serves to feed the sauce to a discharge opening 82 for loading into containers or onto a conveyer. The shaft 77 is journaled in bearings 78 and 79 which are supported by brackets from feet 14 of the frame and from the end wall 80 of the tube 76, respectively.

The gearing for driving the several feed shafts 25, 31, 60, 67 and 77 has not been shown, but any suitable variable speed drive may be employed for this purpose. Through timed rotation of these several shafts, feed of the sugar, feed of the chopped apples, pre-cooking, and cooking operations may be synchronized, and this synchronization may be attained over a wide range of speeds permitting a broad choice of production rates.

While the invention has been described in connection with the cooking of applesauce it is not restricted to such use but may be employed in the preparation of other foodstuffs also.

While the invention has been described, therefore, in connection with a particular embodiment thereof and a particular use therefor, it is capable of further modification and use, and this application is intended to cover any variations, uses, or adaptations of the invention, following, in general, the principles of the invention and including such departures from the present disclosure as come with known or customary practice in the art to which the invention pertains and as may be applied to the essential features hereinbefore set forth and as fall within the scope of the invention or the limits of the appended claims.

Having thus described my invention, what I claim is:

1. A continuous process machine for cooking foodstuffs, comprising a tank, a container mounted wholly within the tank above the bottom thereof and enclosed by said tank, said tank having an entry port at its top through which foodstuff may be fed into said container, said container having a discharge port through which foodstuff may be discharged from said container into the bottom of said tank, and said tank having an exit port through which cooked foodstuff may be discharged from said tank, means for propelling foodstuff through said container at a relatively fast rate, means mounted below said container for propelling foodstuff at a relatively slow rate from said discharge port to said exit port, said container opening at its top into said tank, and means for injecting steam into the bottom of said tank to cook the foodstuff in the bottom of the tank and to pre-cook the foodstuff in said container both by direct application of steam through the container opening to the foodstuff in the container and by convection through the walls of said container.

2. A continuous process machine for cooking foodstuffs comprising a tank, a trough-shaped container mounted in the tank above the bottom thereof and enclosed by said tank and opening at its top into said tank below the top of said tank, said tank having an entry port at its top through which foodstuff may be fed into said container, said container having a discharge port through which foodstuff may be discharged from said container into the bottom of said tank, and said tank having an exit port through which cooked foodstuff may be discharged from said tank, a rotary feed screw mounted in said tank for feeding foodstuff through said container from said entry port to said discharge port, a second rotary feed screw mounted in said tank below said container for feeding foodstuff through said tank from said discharge port to said exit port, means for rotating said two feed screws, the pitch of said second feed screw being less than that of the first feed screw whereby the foodstuff will travel at a slower rate through the tank than through the container, and means for injecting steam into the bottom of the tank to cook foodstuff in the tank and to pre-cook foodstuff in the container both by direct application of steam through the container opening to the foodstuff in the container and by convection through the walls of the container.

3. A continuous process machine for cooking foodstuffs comprising an enclosed tank, a trough-shaped container mounted in the tank above the bottom thereof and opening at its top below the top of said tank, so as to be enclosed by said tank, said tank having an entry port at its top through which foodstuff may be fed into said container and said tank having an exit port at its bottom through which cooked foodstuff may be discharged from said tank, a rotary feedscrew mounted to rotate in said container to feed foodstuff through the container from one end thereof to the other, said container being provided at the latter end with a discharge port through which foodstuff may discharge from said container onto the bottom of said tank, a rotary feed shaft mounted in said tank below said container for feeding the foodstuff in the bottom of the tank to said exit port, said exit port being located at the opposite end of the tank from said discharge port, said rotary feed shaft having groups of vanes thereon alternating axially of said shaft with feed screw sections, means for rotating said feed screw and said feed shaft, and means for injecting steam into the bottom of said tank to cook foodstuff in said tank and to pre-cook foodstuff in said container both by direct application of steam through the container opening to the foodstuff in the container and by convection through the walls of the container, the pitch of the feed screw sections of said feed shaft being less than the pitch of said feedscrew, and the vanes on said feed shaft being scoop-shaped to lift foodstuff up out of the slurry thereof in the bottom of said tank as said shaft rotates.

EDWIN ALLAN.

REFERENCES CITED

The following references are of record in the file of this patent:

UNITED STATES PATENTS

| Number | Name | Date |
|---|---|---|
| 173,078 | Stacy | Feb. 1, 1876 |
| 627,419 | Hoppenstedt et al. | June 20, 1899 |
| 1,421,283 | Meakin | June 27, 1922 |
| 1,545,596 | Olney | July 14, 1925 |
| 1,595,088 | Gudger | Aug. 10, 1926 |
| 1,680,087 | Conroy et al. | Aug. 7, 1928 |
| 1,726,816 | Forrest | Sept. 3, 1929 |
| 2,200,192 | Sipe | May 7, 1940 |
| 2,404,884 | Pieper | July 30, 1946 |
| 2,452,249 | Leiske | Oct. 26, 1948 |
| 2,485,854 | Zona | Oct. 25, 1949 |

FOREIGN PATENTS

| Number | Country | Date |
|---|---|---|
| 24,997 | Germany | June 16, 1883 |
| 514,077 | Germany | Dec. 8, 1930 |